US012786951B2

(12) United States Patent
Hong

(10) Patent No.: US 12,786,951 B2
(45) Date of Patent: Nov. 3, 2026

(54) METHOD AND BASE STATION FOR INDICATING INFORMATION BASED ON PAGING CAUSE, AND METHOD AND TERMINAL FOR DETERMINING INFORMATION BASED ON PAGING CAUSE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 298 days.

(21) Appl. No.: 18/257,441

(22) PCT Filed: Dec. 24, 2020

(86) PCT No.: PCT/CN2020/139155
§ 371 (c)(1),
(2) Date: Jun. 14, 2023

(87) PCT Pub. No.: WO2022/133950
PCT Pub. Date: Jun. 30, 2022

(65) Prior Publication Data
US 2024/0023065 A1 Jan. 18, 2024

(51) Int. Cl.
*H04W 68/02* (2009.01)
*H04W 68/00* (2009.01)

(52) U.S. Cl.
CPC .................................. *H04W 68/02* (2013.01)

(58) Field of Classification Search
CPC .................................................... H04W 68/02
USPC .......................................................... 455/458
See application file for complete search history.

(56) References Cited

U.S. PATENT DOCUMENTS 8,892,091 B2 * 11/2014 Schmidt ................ H04W 68/00 455/67.11
2004/0176112 A1 * 9/2004 Beckmann .......... H04W 68/025 455/518
2006/0104225 A1 * 5/2006 Kim ...................... H04L 12/189 370/313
2006/0189331 A1 * 8/2006 Lundsjo ................ H04W 68/12 455/435.2
2009/0181676 A1 * 7/2009 Lee ...................... H04J 11/0093 455/436
2010/0130205 A1 * 5/2010 Jung ................ H04W 36/0066 455/435.2

(Continued)

FOREIGN PATENT DOCUMENTS

CN 102833699 A 12/2012
CN 105493574 A 4/2016

(Continued)

OTHER PUBLICATIONS

ZTE, Paging design in NR, 3GPP TSG RAN WG1 NR Ad-Hoc#2, R1-1709893, Qingdao, P.R. China, Jun. 27-30, 2017, 7 pages.

(Continued)

*Primary Examiner* — Mark G. Pannell
(74) *Attorney, Agent, or Firm* — Finnegan, Henderson, Farabow, Garrett & Dunner, L.L.P.

(57) ABSTRACT

A method for indicating information is performed by a base station, and includes: sending a paging signaling to a terminal, wherein the paging signaling carries indication information of a paging cause.

15 Claims, 3 Drawing Sheets

(56) References Cited

U.S. PATENT DOCUMENTS

| | | | | |
|---|---|---|---|---|
| 2013/0343280 | A1* | 12/2013 | Lee | H04L 63/20 370/328 |
| 2015/0049662 | A1* | 2/2015 | Kim | H04W 48/20 370/312 |
| 2015/0092611 | A1 | 4/2015 | Ponukumati et al. | |
| 2017/0150545 | A1 | 5/2017 | Ramkumar et al. | |
| 2019/0174394 | A1* | 6/2019 | Lu | H04W 72/56 |
| 2019/0313365 | A1* | 10/2019 | Islam | H04W 48/12 |
| 2020/0304984 | A1 | 9/2020 | Dhanapal et al. | |
| 2021/0014822 | A1* | 1/2021 | Gurumoorthy | H04W 68/02 |
| 2021/0392615 | A1* | 12/2021 | Wong | H04W 68/005 |
| 2021/0392616 | A1* | 12/2021 | Stojanovski | H04W 68/02 |
| 2022/0053448 | A1* | 2/2022 | Velev | H04W 76/27 |
| 2022/0116909 | A1* | 4/2022 | Jung | H04W 74/0833 |
| 2022/0132456 | A1* | 4/2022 | Rajadurai | H04W 60/00 |
| 2022/0279469 | A1* | 9/2022 | Ingale | H04W 76/30 |
| 2022/0330194 | A1* | 10/2022 | Kumar | H04W 68/02 |
| 2023/0038897 | A1* | 2/2023 | Li | H04W 68/02 |
| 2023/0262657 | A1* | 8/2023 | Kim | H04W 68/02 455/458 |
| 2023/0269701 | A1* | 8/2023 | Hong | H04W 68/005 455/458 |
| 2023/0319780 | A1* | 10/2023 | Choi | H04W 68/025 455/458 |
| 2023/0379998 | A1* | 11/2023 | Jung | H04W 76/20 |
| 2024/0196365 | A1* | 6/2024 | Jiang | H04W 68/005 |

FOREIGN PATENT DOCUMENTS

| | | | |
|---|---|---|---|
| CN | 110730445 | A | 1/2020 |
| CN | 101895986 | A | 11/2020 |
| CN | 111919478 | A | 11/2020 |
| IN | 202042015019 | A | 10/2020 |
| WO | WO 2012/058797 | A1 | 5/2012 |
| WO | 2018005419 | A1 | 1/2018 |
| WO | WO 2020/106611 | A1 | 5/2020 |
| WO | 2020147839 | A1 | 7/2020 |

OTHER PUBLICATIONS

Intel Corporation, RAN-initiated paging details, 3GPP TSG RAN WG2 Meeting #101, R2-1802933, Athens, Greece, Feb. 26-Mar. 2, 2018, 6 pages.

International Search Report of International Application No. PCT/CN2020/139155, dated Sep. 27, 2021, 2 pages.

Notification to Grant Patent Right for Invention, for Chinese Application No. 202080004051.5, dated Aug. 1, 2025, 6 pages.

Samsung, "Effective Solution for Paging Collision Avoidance", 3GPP TSG-RAN WG2 Meeting #112-e, R2-2009538, Online, Nov. 2-13, 2020, 5 pages.

Qualcomm Incorporated, "Preventing paging collisions for Multi-SIM", 3GPP TSG-RAN WG2 Meeting #112-e, R2-2009556, Electronic, Nov. 2-13, 2020, 4 pages.

MediaTek, Inc., "FS_MUSIM: KI #2, New Sol: Enabling Paging Reception for Multi-USIM Device", SA WG2 Meeting #139E, S2-2004050, Jun. 1-12, 2020, 3 pages.

The First Office Action for Chinese Application No. 202080004051.5, dated Jan. 24, 2025, 15 pages.

* cited by examiner

METHOD AND BASE STATION FOR INDICATING INFORMATION BASED ON PAGING CAUSE, AND METHOD AND TERMINAL FOR DETERMINING INFORMATION BASED ON PAGING CAUSE

CROSS-REFERENCE

The present application is a U.S. National Stage of International Application No. PCT/CN2020/139155, filed on Dec. 24, 2020, the entire content of which is incorporated herein by reference.

TECHNICAL FIELD

The present disclosure relates to a field of communication technology, and more par-ticularly to a method and an apparatus for indicating information, a method and an apparatus for determining information, an electronic device and a computer-readable storage medium.

BACKGROUND

In mobile communication, a network side device may send a paging signaling to a terminal at a specific moment to notify the terminal to execute a corresponding operation. For example, for a UE in a disconnected state, a base station may notify the terminal of an incoming call through a paging signaling.

SUMMARY

According to a first aspect of the present disclosure, a method for indicating information is performed by a base station, and the method includes:

sending a paging signaling to a terminal, where the paging signaling carries indication information of a paging cause.

According to a second aspect of the present disclosure, a method for determining information is performed by a terminal, and the method includes:

receiving a paging signaling sent by a base station; where the paging signaling carries indication information of a paging cause; and determining, based on the indication information, a paging cause of the paging signaling.

According to a third aspect of the present disclosure, a base station includes:

a processor; and a memory for storing executable instructions of the processor;

where the processor is configured to send a paging signaling to a terminal, the paging signaling carries indication information of a paging cause.

According to a fourth aspect of the present disclosure, a terminal includes:

a processor; and a memory for storing executable instructions of the processor;

where the processor is configured to receive a paging signaling sent by a base station; where the paging signaling carries indication information of a paging cause; and determine, based on the indication information, a paging cause of the paging signaling.

BRIEF DESCRIPTION OF THE DRAWINGS

In order to more clearly explain the technical solution in the embodiments of the present disclosure, the following will briefly introduce the drawings needed in the description of the embodiments. It is obvious that the drawings in the following description are only some embodiments of the present disclosure. For those skilled in the art, other drawings may be obtained from these drawings without paying creative labor.

DETAILED DESCRIPTION

The technical solutions in embodiments of the disclosure will be described clearly and completely in combination with the drawings in embodiments of the present disclosure. It is obvious that the embodiments described are only example embodiments in the present disclosure, rather than all embodiments. On the basis of embodiments of the present disclosure, other embodiments obtained by those skilled in the art may be within the protection scope of the present disclosure.

In the related art, after receiving the paging signaling, the terminal may be unable to accurately determine how to handle the paging signaling, for example, the paging signaling may conflict with the communication operation being executed by the terminal, causing the terminal to be unable to determine whether to respond to the paging signaling, thus affecting the execution efficiency of the terminal.

Figure 1:
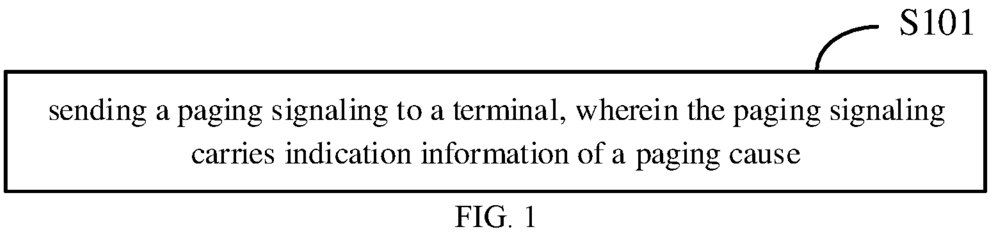
FIG. 1 is a schematic flowchart of a method for indicating information illustrated according to an embodiment of the present disclosure.

FIG. 1 is a schematic flowchart of a method for indicating information illustrated according to an embodiment of the present disclosure. The method for indicating information illustrated in the embodiment may be applicable to a base station, and the base station includes, but is not limited, to a 4G base station, a 5G base station, and a 6G base station. The base station may communicate with a terminal served as a user equipment, and the terminal includes, but is not limited to, an electronic device such as a mobile phone, a tablet computer and a wearable device, a sensor, and an Internet of Things device. In an embodiment, the terminal may be a terminal to which the method for determining information in any following embodiment is applicable.

As illustrated in FIG. 1, the method for indicating information may include the following step S101:

In step S101, a paging signaling is sent to a terminal, and the paging signaling carries indication information of a paging cause.

In an embodiment, the base station may first acquire the paging cause, for example, the base station may acquire the paging cause of the terminal from a core network; and/or acquire the paging cause of the terminal from a neighboring base station of the base station.

In an embodiment, the base station may send the paging signaling to the terminal after acquiring the paging cause. In addition, the base station may carry the indication information of the paging cause in the paging signaling.

In an embodiment, the indication information may be carried in a paging record (PagingRecord) unit of the paging signaling. For example, for the paging signaling in a LTE network, an original PagingRecord information unit includes an information unit such as a ue-Identity, a cn-Domain. According to the present embodiment, a Paging-Cause information unit may be added to the PagingRecord information unit to carry the indication information of the paging cause. Of course, this is only an example description, and the indication information may also be carried in other information units, which is not limited in the embodiment herein.

In an embodiment, after receiving the paging signaling, the terminal may analyze the paging signaling to acquire the indication information, and then determine the paging cause of the paging signaling according to the indication information.

Based on the paging cause, the terminal may implement a plurality of optimization processing solutions. In an embodiment, the terminal may determine a processing strategy for the paging signaling according to the paging cause, and for example, the terminal may determine whether to respond to the paging signaling. For example, the paging cause of the paging signaling may be a voice call, if the terminal receives the paging signaling during an communication operation related to network data, it may determine that a priority of the voice call is higher than the network data processing, thereby suspending the network data operation and responding to the voice call; or, the terminal may determine that the priority of the paging signaling is not higher than the communication operation currently being executed, and may continue to execute the current communication operation without responding to the paging signaling.

It should be noted that determining whether to respond to the paging signaling according to the paging cause is merely an optional processing solution, and the terminal may also perform other operations according to the paging cause, such as determining an execution order of the communication operation corresponding to the paging signaling according to the paging signaling, which may be determined by the terminal according to actual situation, which is not limited in the embodiment herein.

It should be noted that the paging signaling in the above embodiments may be a paging signaling in an LTE network, or a paging signaling in a NR network, or a paging signaling in other network, which is not limited in the embodiment herein. For different networks, the basic format of paging signaling may be different, and the paging cause may also be different, which may be specifically determined according to the actual situation of the network without any limitation in the embodiment herein. For example, when the base station is a base station in the NR network, it may send a paging signaling conforming to the NR network to the terminal and carry a corresponding paging cause.

So far, the embodiment illustrated in FIG. 1 has been completed. According to the embodiment illustrated in FIG. 1, the base station may actively send the paging cause to the terminal through the paging signaling, such that the terminal may analyze and determine the paging cause after receiving the paging signaling, and determine the execution strategy according to the paging cause, which improves the execution efficiency of the terminal. According to the embodiment illustrated in FIG. 1, the terminal does not need to request the base station to acquire the paging cause, but rather, the base station actively sends the paging cause, which also improves the processing efficiency and avoids signaling waste.

In an embodiment, the candidate paging cause may be preset, and the base station determines the paging cause corresponding to the terminal according to the candidate paging cause, and carries the indication information of the paging cause carried in the paging signaling to the terminal. In an embodiment, there may be one or a plurality of candidate paging causes, as described below in combination with two specific embodiments, respectively.

Embodiment 1: there is one preset candidate paging cause.

In an embodiment, the paging cause is the preset candidate paging cause. For example, the preset candidate paging cause is voice, and the base station may determine that the paging cause corresponding to the terminal is the candidate paging cause voice, and carry the indication information of the paging cause in the paging signaling.

In an embodiment, the base station and the terminal may pre-negotiate a corresponding relationship between the indication information and the candidate paging cause; or the base station may send a corresponding relationship to the terminal, for example, by sending a system message. After receiving the paging signaling, the terminal may determine the paging cause indicated by the indication information according to the corresponding relationship.

In an embodiment, when the base station is unable to determine the paging cause of the paging signaling, the base station may send the paging signaling that does not include the paging cause to the terminal, or may also carry other indication information that indicates that the paging cause is unknown, which is not limited in the embodiment herein. Thus, after receiving the paging signaling, the terminal may determine that the paging cause is unknown.

In an embodiment, the base station and the terminal may preset a data type of the indication information, which may be an enumeration type, a Boolean type, or an integer type, as illustrated in the following examples, respectively.

Embodiment 1.1: the indication information is of the enumeration type.

In an embodiment, the base station and the terminal may predetermine that the indication information is of the enumeration type, and the indication information is an enumeration value corresponding to the candidate paging cause. For example, the enumeration value corresponding to the paging cause may be a name of the paging cause, such as voice, or the enumeration value may also be other value that is preset, such as identifier A.

In an embodiment, the terminal may determine the corresponding paging cause according to the enumeration value.

Taking the indication information being carried in the PagingRecord unit of the paging signaling as an example, the PagingRecord unit in the LTE network may be:

```
PagingRecord ::=        SEQUENCE {
    ue-Identity             PagingUE-Identity,
```

-continued

```
      cn-Domain            ENUMERATED      {ps, cs},
      ...,
      [[
    pagingCause-r17      ENUMERATED {voice}      OPTIONAL -- Need ON
      ]]
  }
```

Taking the indication information being carried in the PagingRecord unit of the paging signaling as an example, the PagingRecord unit in the NR network may be:

```
  PagingRecord ::=          SEQUENCE {
     ue-Identity           PagingUE-Identity,
     accessType              ENUMERATED {non3GPP}      OPTIONAL, -- Need N
       ... ,
     [[
     pagingCause-r17           ENUMERATED {voice}          OPTIONAL --
Need ON
     ]]
  }
```

Embodiment 1.2: the indication information is of the Boolean type.

In an embodiment, the base station and the terminal may predetermine that the indication information is of the Boolean type, and the indication information is a Boolean value corresponding to the candidate paging cause. In an embodiment, the Boolean value corresponding to the paging cause may be true (or 1) or false (or 0). Taking that the paging cause is voice as an example, the indication information corresponding to voice may be predefined as true, and the indication information true may be carried in the paging signaling that is sent.

In an embodiment, the terminal may determine the corresponding paging cause according to the Boolean value.

Taking the indication information being carried in the PagingRecord unit of the paging signaling as an example, the PagingRecord unit in the LTE network may be:

```
PagingRecord ::=         SEQUENCE {
   ue-Identity              PagingUE-Identity,
   cn-Domain                ENUMERATED       {ps, cs},
   ...,
   [[
   pagingCause-r17             BOOLEAN      OPTIONAL -- Need ON
   ]]
}
```

Taking the indication information being carried in the PagingRecord unit of the paging signaling as an example, the PagingRecord unit in the NR network may be:

```
  PagingRecord ::=            SEQUENCE {
     ue-Identity            PagingUE-Identity,
     accessType               ENUMERATED {non3GPP}    OPTIONAL, -- Need N
       ... ,
         [[
         pagingCause-r17         BOOLEAN                   OPTIONAL--   Need
ON
         ]]
  }
```

Embodiment 1.3: the indication information is of an integer type.

In an embodiment, the base station and terminal may predetermine that the indication information is of the integer type, and the indication information is an integer value corresponding to the candidate paging cause. In an embodiment, the integer value corresponding to the paging cause may be a predefined value, such as 0 or 1. Taking that the paging cause is voice as an example, the indication information corresponding to voice may be predefined as 0, and the indication information 0 may be carried in the paging signaling that is sent.

In an embodiment, the indication information occupies at least one bit in response to that the indication information is the integer value. For example, if 0 or 1 is used as the indication information, the indication information may occupy one bit. If other integer value is used as the indication information, the indication information may occupy a plurality of bits.

In an embodiment, the paging cause may be carried in the PagingRecord unit of the paging signaling, and its specific form may refer to the above embodiments 1.1 and 1.2, which will not be repeated herein.

Embodiment 2: there are a plurality of preset candidate paging causes.

In an embodiment, the terminal and the base station may predetermine a plurality of candidate paging causes. The paging cause of the terminal determined by the base station may be at least one of the plurality of candidate paging causes, and the base station send the indication information, carried in the paging signaling, of each determined paging cause to the terminal.

For example, the preset candidate paging cause includes a voice, a message, an origination voice, a termination voice, a data switching domain voice, a circuit switching domain voice, a video, and the like. The base station may determine that the paging cause is at least one of the plurality of candidate paging causes. For example, if it is determined that the paging cause is voice, the base station carries the indication information of voice in the paging signaling; or if it is determined that the paging cause is voice and message, the base station carries the indication information of voice and the indication information of message in the paging signaling. Of course, the candidate paging cause, such as voice and message and the like, which is only illustrated here as an example, and in practical applications, the preset candidate paging causes may also include others. For the convenience of description, each candidate paging cause is described as spareM (M=1,2,3 . . . ) in the following examples.

In an embodiment, the above plurality of candidate paging causes may also include content for indicating that the cause is unknown. For example, when the base station is unable to determine the paging cause of the paging signaling, it may send the paging signaling carrying indication information for indicating that the cause is unknown to the terminal. Thus, after receiving the paging signaling, the terminal may determine that the paging cause is unknown.

In an embodiment, the base station and the terminal may predetermine the corresponding relationship between the indication information and the candidate paging cause. In an embodiment, after receiving the paging signaling, the terminal may query the paging cause indicated by the indication information in the corresponding relationship.

In an embodiment, the base station and the terminal may preset a data type of the indication information, which may be an enumeration type, a Boolean type, or an integer type, as illustrated in the following examples, respectively.

Embodiment 2.1: the indication information is of the enumeration type.

In an embodiment, the base station and the terminal may predetermine that the indication information is of the enumeration type, and the indication information is an enumeration value corresponding to at least one of the candidate paging causes. For example, the enumeration value corresponding to the paging cause may be a name of each paging cause, such as voice, message, and the like, or the enumeration value may also be other value that is preset, such as identifier A, B, C, and the like.

In an embodiment, the indication information received by the terminal may be at least one enumeration value. The terminal may determine at least one candidate paging cause corresponding to the at least one enumeration value based on a preset corresponding relationship between each candidate paging cause and the indication information. For example, if the enumeration value received by the terminal is voice, the terminal may determine that the paging cause corresponding to the enumeration value is voice; if the terminal receives the enumeration value A, the terminal may determine the paging cause corresponding to the enumeration value A according to the preset corresponding relationship, which may be, for example, the enumeration value A corresponding to voice.

Taking the indication information being carried in the PagingRecord unit of the paging signaling as an example, the PagingRecord unit in the LTE network may be:

```
PagingRecord ::=            SEQUENCE {
    ue-Identity                 PagingUE-Identity,
    cn-Domain                   ENUMERATED      {ps, cs},
    ...,
    [[
    pagingCause-r17                 ENUMERATED      {voice, mes-
sage,spare1,spare2,spare3}          OPTIONAL -- Need ON
    ]]
}
```

Taking the indication information being carried in the PagingRecord unit of the paging signaling as an example, the PagingRecord unit in the NR network may be:

```
PagingRecord ::=            SEQUENCE {
    ue-Identity             PagingUE-Identity,
    accessType                  ENUMERATED {non3GPP}    OPTIONAL, -- Need N
    ... ,
    [[
    pagingCause-r17             ENUMERATED              {       voice,mes-
sage,spare1,spare2,spare3}          OPTIONAL -- Need ON
    ]]
}
```

It should be noted that in the above embodiments, for the convenience of description, the candidate paging causes are recorded as spare1, spare2 and spare3, which are not specific limitations. In practical applications, more or fewer candidate paging causes may also be included. Here, spareN may be an origination voice, a termination voice, a data switching domain voice, a circuit switching domain voice, a video, and the like, which is not limited in the embodiment herein.

Embodiment 2.2: the indication information is of a string type.

In an embodiment, the base station and the terminal may predetermine that the indication information is of the string type, and the indication information is the string corresponding to at least one of the candidate paging causes. For example, the string corresponding to the paging cause may be a string corresponding to a name of each paging cause, such as voice, message, and the like, or the string may also be other string, such as “stringA”, “stringB” and the like, and the string corresponds to each paging cause, respectively, such as the string “stringA” corresponding to voice, and the string “stringB” corresponding to message.

In an embodiment, the indication information received by the terminal may be at least one string. The terminal may determine at least one candidate paging cause corresponding to the at least one string based on the preset corresponding relationship between each candidate paging cause and the indication information. For example, if the string received by the terminal is “voice”, the terminal may determine the paging cause corresponding to the string is voice; if the string received by the terminal is “stringA”, the terminal may determine the paging cause corresponding to the string “stringA” according to the preset corresponding relationship, which may be, for example, “stringA” corresponding to voice.

Embodiment 2.3: the indication information is of an integer type.

In an embodiment, the base station and terminal may predetermine that the indication information is of the integer type, and the indication information is an integer value corresponding to at least one of the candidate paging causes. For example, the integer value corresponding to the paging cause may be 0, 1, 2, 3 . . . and the like, and each integer value corresponds to the paging cause, respectively, such as 1 corresponding to voice, and 2 corresponding to message.

In an embodiment, the indication information received by the terminal may be at least one integer value. The terminal may determine at least one candidate paging cause corresponding to the at least one integer value based on the preset corresponding relationship between each candidate paging cause and the indication information. For example, if the terminal receives the integer value 1, the terminal may determine the paging cause corresponding to the integer value 1 according to the preset corresponding relationship, which may be, for example, 1 corresponding to voice.

In an embodiment, the base station and terminal may predetermine that the indication information is of an integer type, and the indication information at least occupies $\log_2 N$ bits; where N is a number of types of the paging causes. For example, if there are 8 types of candidate paging causes, corresponding to 8 indication information respectively, the indication information at least occupies 3 (i.e. $\log_2 8$) bits. Or, more bits may be used for indication, which is not limited in the embodiment herein.

So far, the introduction of specific embodiments in which there is one or a plurality of candidate paging causes is completed. Of course, this is merely an illustration. In practical applications, the paging signaling may also carry the paging cause in other ways, which is not limited in the embodiment herein.

In an embodiment, the base station may use the method described in the above embodiments to indicate the paging cause to a multi-card terminal. The multi-card terminal is at least provided with a first SIM card and a second SIM card, and the paging cause includes a paging cause of the first SIM card and/or a paging cause of the second SIM card.

In an embodiment, the terminal may perform corresponding processing strategies based on the paging causes corresponding to the first SIM card and the second SIM card, respectively. For example, if a communication operation of the first SIM card conflicts with a communication operation of the second SIM card, the terminal may determine which communication operation to execute or determine the execution order of the two communication operations according to the paging cause of the first SIM card and the paging cause of the second SIM card.

In an embodiment, the base station may send the paging cause of the first SIM card or the paging cause of the second SIM card to the terminal.

For example, when the first SIM card is performing a communication operation, such as a voice call, the base station may send a paging signaling with a paging cause to the second SIM card. Thus, the terminal may receive the paging cause of the second SIM card, and determine whether to respond to the paging signaling of the second SIM card according to the paging cause of the first SIM card previously received. Of course, t this is merely an illustration and other cases may be included in practical applications, which is not limited in the embodiment herein.

In an embodiment, the base station may send the paging cause of the first SIM card and the paging cause of the second SIM card to the terminal. Thus, the paging causes of multiple SIM cards may be transmitted according to one paging signaling, which improves the communication efficiency between the base station and the terminal. Further, the terminal may acquire the paging causes corresponding to multiple SIM cards according to one paging signaling received, such that the terminal does not perform additional query or acquisition, which improves the processing efficiency of the terminal.

In an embodiment, the first SIM card and the second SIM card correspond to the same base station, so the base station may acquire the paging causes of the two SIM cards and send them to the terminal when necessary. In an embodiment, the first SIM card and the second SIM card may also correspond to different base stations, and then one of the base stations may acquire the paging cause from the other base station.

For example, when the first SIM card is performing a communication operation, such as the first SIM card is on a voice call, the base station may carry the paging cause of the first SIM card and the paging cause of the second SIM card while sending the paging signaling to the second SIM card, such that the terminal may directly process according to the received paging signaling. For example, the terminal may determine priorities of the communication operations corresponding to the two SIM cards according to the paging cause of the first SIM card and the paging cause of the second SIM card, so as to determine an order to execute the communication operations, or determine that only the communication operation corresponding to one of the SIM cards is performed.

Figure 2:
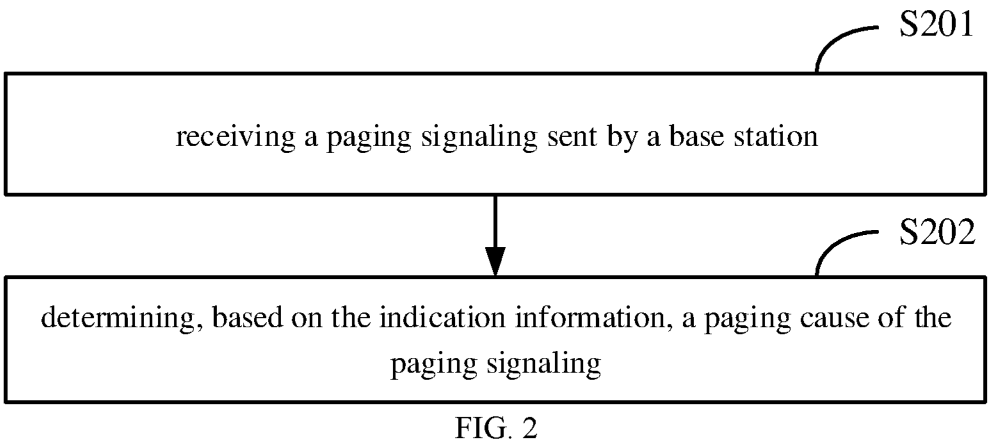
FIG. 2 is a schematic flowchart of a method for determining information illustrated according to an embodiment of the present disclosure.

FIG. 2 is a schematic flowchart of a method for determining information illustrated according to an embodiment of the present disclosure. The method for determining information illustrated in the present embodiment may be applicable to a terminal, and the terminal includes, but is not limited to, an electronic device such as a mobile phone, a tablet computer and a wearable device, a sensor, and an Internet of Things device. The terminal may communicate with a base station served as a user equipment. The base station includes, but is not limited to, a 4G base station, a 5G base station, and a 6G base station. In an embodiment, the base station may be a base station to which the method for indicating information described in any of the above embodiments is applicable.

As illustrated in FIG. 2, the method for determining information may include the following steps S201 and S202:

in step S201, a paging signaling sent by a base station is received, where the paging signaling carries indication information of a paging cause.

in step S202, a paging cause of the paging signaling is determined based on the indication information.

In an embodiment, the base station may send the paging signaling to the terminal, and the indication information of paging cause is carried in the paging signaling. Thus, after receiving the paging signaling, the terminal may analyze the paging signaling to acquire the indication information, and determine the paging cause of the paging signaling according to the indication information.

Based on paging causes, the terminal may implement a plurality of optimization processing solutions. In an embodiment, the terminal may determine a processing strategy for the paging signaling according to the paging cause, and for example, may determine whether to respond to the paging signaling, or may determine an execution order of the communication operation corresponding to the paging signaling. The specific implementation of the terminal may refer to the embodiment illustrated in FIG. 1, which will not be repeated herein.

In an embodiment, the paging signaling sent by the base station may be a paging signaling in a LTE network, or a paging signaling in a NR network, or a paging signaling in other network, which is not limited in the embodiment herein.

Thus, the embodiment illustrated in FIG. 2 is completed. According to the embodiment illustrated in FIG. 2, the terminal may determine the paging cause through the paging signaling sent by the base station, so as to execute the corresponding processing strategy according to the paging cause, which improves the execution efficiency. Moreover, the terminal does not need to request the base station for the paging cause, which improves the interaction efficiency and avoids signaling waste.

In an embodiment, the base station may carry the indication information of the paging cause in a paging record (PagingRecord) unit of the paging signaling. Thus, the terminal may determine the paging cause of the paging signaling based on the indication information, which includes: acquiring a parameter unit for carrying the indication information in a paging record (PagingRecord) unit of the paging signaling; and determining the paging cause based on the indication information.

In an embodiment, a candidate paging cause may be preset, and the base station determines the paging cause corresponding to the terminal according to the candidate paging cause, and the indication information of the paging cause is carried in the paging signaling and sent to the terminal. The terminal may receive the paging signaling and determine the corresponding paging cause according to the indication information.

In an embodiment, there may be one candidate paging cause, and the paging cause is a preset candidate paging cause; the method for determining the paging cause based on the indication information includes the following that:

in response to the indication information being an enumeration value, the candidate paging cause corresponding to the enumeration value is determined;

or, in response to the indication information being a Boolean value, the candidate paging cause corresponding to the Boolean value is determined;

or, in response to the indication information being an integer value, the candidate paging cause corresponding to the integer value is determined.

In an embodiment, in response to the indication information being the integer value, the indication information occupies at least one bit.

It should be noted that the base station and the terminal may preset a data type of the indication information, for example, may be an enumeration type, a Boolean type or an integer type. For the three different data types, the indication information may be an enumeration value, a Boolean value, and an integer value. Thus, the terminal may determine the corresponding candidate paging cause according to the indication information, and use the candidate paging cause as the paging cause corresponding to this paging signaling.

In an embodiment, there are a plurality of candidate paging causes, so the paging cause is at least one of the preset candidate paging causes; the terminal is preset with a corresponding relationship between each candidate paging cause and the indication information.

in response to the indication information being at least one enumeration value, at least one candidate paging cause corresponding to the at least one enumeration value is determined based on the corresponding relationship;

or, in response to the indication information being at least one string, at least one candidate paging cause corresponding to the at least one string is determined based on the corresponding relationship; or, or, in response to the indication information being at least one integer value, at least one candidate paging cause corresponding to the at least one integer value is determined based on the corresponding relationship.

In an embodiment, in response to the indication information being the integer value, the indication information at least occupies log 2N bits; where N is a number of the candidate paging causes.

In an embodiment, the base station and the terminal may predetermine the corresponding relationship between the indication information and the candidate paging cause. In an embodiment, after receiving the paging signaling, the terminal may query the paging cause indicated by the indication information in the corresponding relationship.

It should be noted that the base station and the terminal may preset a data type of the indication information, for example, may be an enumeration type, a Boolean type or an integer type. For the three different data types, the indication information may be an enumeration value, a Boolean value, and an integer value. Thus, for different data types, the terminal may query at least one candidate paging cause corresponding to the indication information in the corresponding relationship, and use the at least one candidate paging cause as the paging cause corresponding to this paging signaling.

In an embodiment, the method for determining information described in the above embodiments may be applied to a multi-card terminal. The multi-card terminal is at least equipped with a first SIM card and a second SIM card. The determining the paging cause of the paging signaling based on the indication information includes: determining, based on the indication information, a paging cause corresponding to a paging signaling of the first SIM card and/or a paging cause corresponding to a paging signaling of the second SIM card.

In an embodiment, the base station may send the paging cause of the first SIM card or the paging cause of the second SIM card to the terminal. the terminal may determine an execution strategy of the communication operations corresponding to the two SIM cards according to the paging cause.

In an embodiment, the base station may send the paging cause of the first SIM card and the paging cause of the second SIM card to the terminal. Thus, the paging causes of multiple SIM cards may be transmitted according to one paging signaling, which improves the communication efficiency between the base station and the terminal. Further, the terminal may acquire the paging causes corresponding to multiple SIM cards according to one paging signaling received, such that the terminal does not perform additional query or acquisition, which improves the processing efficiency of the terminal.

Corresponding to the aforementioned embodiments of the method for indicating information, the present disclosure further provides embodiments of an apparatus for indicating information.

Figure 3:
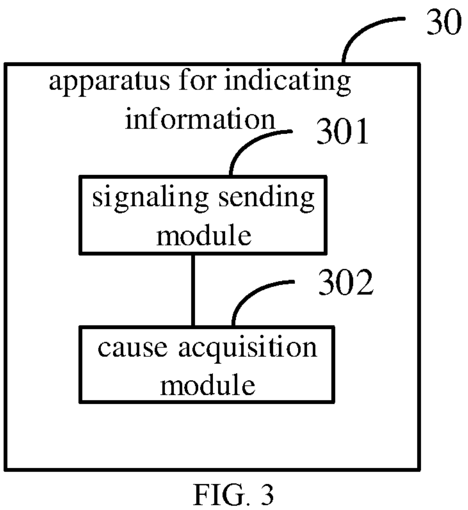
FIG. 3 is a schematic block diagram of an apparatus for indicating information illustrated according to an embodiment of the present disclosure.

FIG. 3 is a schematic block diagram of an apparatus for indicating information illustrated according to an embodiment of the present disclosure. The apparatus for indicating information illustrated in the embodiment may be applicable to a base station, and the base station includes, but is not limited, to a 4G base station, a 5G base station, and a 6G base station. The base station may communicate with a terminal served as a user equipment, and the terminal includes, but is not limited to, an electronic device such as a mobile phone, a tablet computer and a wearable device, a sensor, and an Internet of Things device. In an embodiment, the terminal may be a terminal to which the apparatus for determining information in any following embodiment is applicable.

As illustrated in FIG. 3, the apparatus for indicating information may include:

a signaling sending module 301, configured to send a paging signaling to a terminal, where the paging signaling carries indication information of a paging cause.

In an embodiment, the apparatus for indicating information may include:

a cause acquisition module 302, configured to acquire the paging cause of the terminal from a core network; and/or acquire the paging cause of the terminal from a neighboring base station of the base station.

In an embodiment, the paging cause is a preset candidate paging cause;

the indication information is an enumeration value corresponding to the candidate paging cause; or the indication information is a Boolean value corresponding to the candidate paging cause; or the indication information is an integer value corresponding to the candidate paging cause.

In an embodiment, in response to the indication information being the integer value, the indication information occupies at least one bit.

In an embodiment, the paging cause is at least one of a plurality of preset candidate paging causes;

the indication information is an enumeration value corresponding to at least one of the candidate paging causes; or the indication information is a string corresponding to at least one of the candidate paging causes; or the indication information is an integer value corresponding to at least one of the candidate paging causes.

In an embodiment, in response to the indication information being the integer value, the indication information at least occupies $\log_2 N$ bits, where N is a number of types of the paging causes.

In an embodiment, the indication information is carried in the paging record (PagingRecord) unit of the paging signaling.

In an embodiment, the terminal is at least configured with a first SIM card and a second SIM card, and the paging cause includes a paging cause of the first SIM card and/or a paging cause of the second SIM card.

Corresponding to the aforementioned embodiments of the method for determining information, the present disclosure further provides embodiments of an apparatus for determining information.

Figure 4:
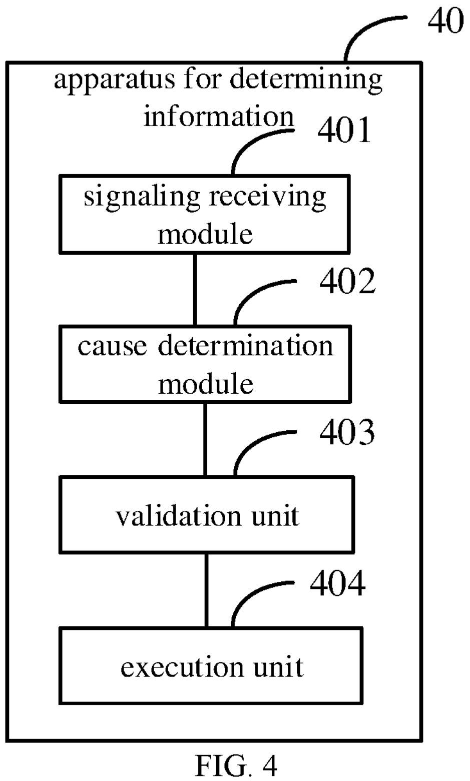
FIG. 4 is a schematic block diagram of an apparatus for determining information illustrated according to an embodiment of the present disclosure.

FIG. 4 is a schematic block diagram of an apparatus for determining information illustrated according to an embodiment of the present disclosure. The apparatus for determining information illustrated in the present embodiment may be applicable to a terminal, and the terminal includes, but is not limited to, an electronic device such as a mobile phone, a tablet computer and a wearable device, a sensor, and an Internet of Things device. The terminal may communicate with a base station served as a user equipment. The base station includes, but is not limited to, a 4G base station, a 5G base station, and a 6G base station. In an embodiment, the base station may be a base station to which the apparatus for determining information described in any of the above embodiments is applicable As illustrated in FIG. 4, the apparatus for determining information may include:

a signaling receiving module 401, configured to receive a paging signaling sent by a base station; where the paging signaling carries indication information of a paging cause;

a cause determination module 402, configured to determine a paging cause of the paging signaling based on the indication information.

In an embodiment, the paging cause is a preset candidate paging cause;

the method for determining the paging cause based on the indication information includes the following that:

in response to the indication information being an enumeration value, the candidate paging cause corresponding to the enumeration value is determined; or in response to the indication information being a Boolean value, the candidate paging cause corresponding to the Boolean value is determined; or in response to the indication information being an integer value, the candidate paging cause corresponding to the integer value is determined.

In an embodiment, in response to the indication information being the integer value, the indication information occupies at least one bit.

the paging cause is at least one of a plurality of preset candidate paging causes; the terminal is preset with a corresponding relationship between each candidate paging cause and the indication information;

in response to the indication information being at least one enumeration value, at least one candidate paging cause corresponding to the at least one enumeration value is determined based on the corresponding relationship; or in response to the indication information being at least one string, at least one candidate paging cause corresponding to the at least one string is determined based on the corresponding relationship; or in response to the indication information being at least one integer value, at least one candidate paging cause corresponding to the at least one integer value is determined based on the corresponding relationship.

In an embodiment, in response to the indication information being the integer value, the indication information at least occupies log N bits; where N is a number of the candidate paging causes.

In an embodiment, the cause determination module 402 is specifically configured to:

acquire a parameter unit for carrying the indication information in a paging record (PagingRecord) unit of the paging signaling; determine the paging cause based on the indication information.

In an embodiment, the terminal is at least configured with a first SIM card and a second SIM card; the determining the paging cause of the paging signaling based on the indication information includes: determining, based on the indication information, a paging cause corresponding to a paging signaling of the first SIM card and/or a paging cause corresponding to a paging signaling of the second SIM card.

With respect to the apparatus in the above embodiments, the specific manner in which each module performs its operation is already described in detail in the relevant method embodiment, and will not be repeated herein.

For the apparatus embodiments, since it corresponds generally to the method embodiments, it is sufficient to refer to the method embodiments for the relevant part of the description. The apparatus embodiments described above are merely schematic, where the modules described as separate components may or may not be physically separated, and the components shown as modules may or may not be physical modules, i.e., they may be located in one place or may be distributed to multiple network modules. Some or all of these modules can be se-lected according to practical needs to achieve the purpose of the solution of the embodiments. It can be understood and implemented by a person of ordinary skill in the art without departing from this application.

The embodiment of the present disclosure further provides an electronic device, including:

a processor;

a memory for storing executable instructions of the processor;

where the processor is configured to execute the method for indicating information and/or the method for determining information described in any one of the above embodiments.

The embodiments of the present disclosure further provides a computer-readable storage medium having a computer program stored thereon, where when the program is executed by a processor, steps in the method for indicating information and/or the method for determining information described in any one of the above embodiments.

Figure 5:
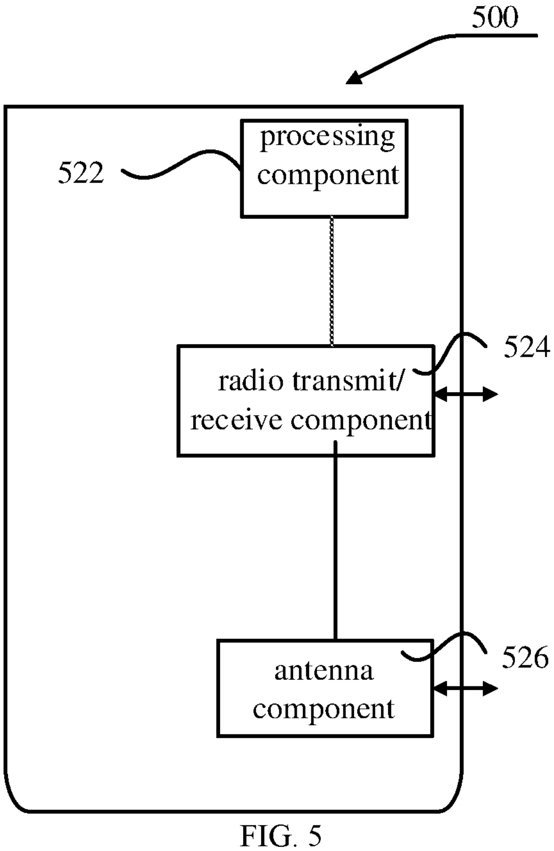
FIG. 5 is a schematic block diagram of a device for information indication illustrated according to an embodiment of the present disclosure.

As shown in FIG. 5, FIG. 5 is a schematic block diagram of an apparatus 500 for indicating information illustrated according to the embodiments of the present disclosure. The apparatus 500 may be served as a base station. Referring to FIG. 5, the apparatus 500 includes a processing component 522, a radio transmit/receive component 524, an antenna component 526, and a signal processing portion specific to the radio interface, and the processing component 522 may further include one or more processors. One of the processors in the processing component 522 may be configured to implement the method for indicating information.

Figure 6:
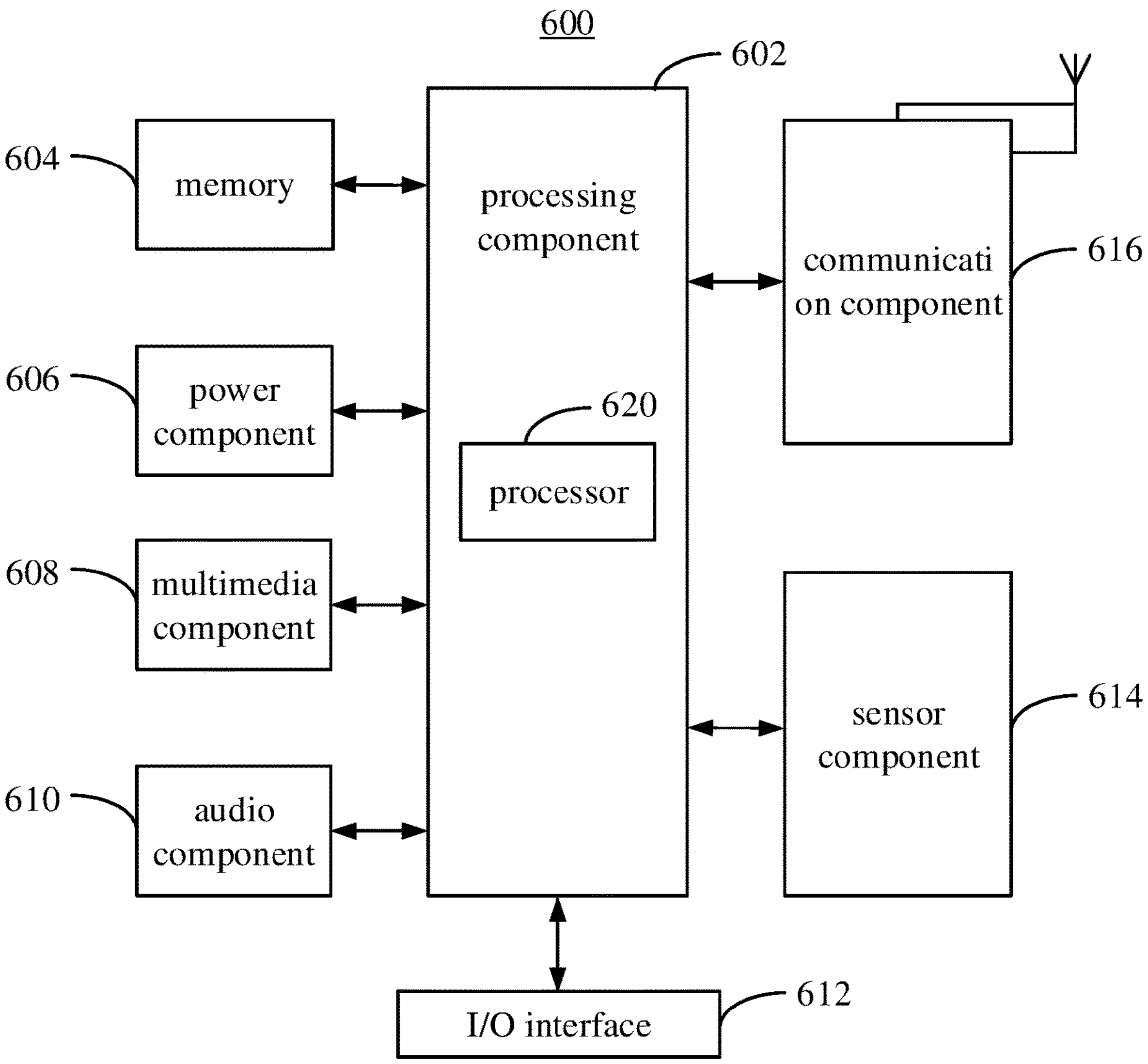
FIG. 6 is a schematic block diagram of a device for information determination illustrated according to an embodiment of the present disclosure.

FIG. 6 is a schematic block diagram of an apparatus 600 illustrated according to the embodiments of the present disclosure. For example, the apparatus 600 may be may be a mobile phone, a computer, a digital broadcast terminal, a message sending and receiving device, a game console, a tablet device, a medical device, a fitness device, a personal digital assistant, and the like.

Referring to FIG. 6, the apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operation of the apparatus 600, such as operations associated with display, phone call, data communication, camera operation, and recording operations. The processing component 602 may include one or more processors 620 to execute instructions to complete all or some of the steps of the method for determining information described above. In addition, the processing component 602 may include one or more modules that facilitate interaction between processing component 602 and other components. For example, processing component 602 may include a multimedia module to facilitate interaction between multimedia component 608 and processing component 602.

The memory 604 is configured to store various types of data to support operation at the apparatus 600. Examples of such data include instructions for any application or method of operation on the apparatus 600, contact data, phonebook data, messages, images, videos, etc. The memory 604 can be implemented by any type of transitory or non-transitory storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or CD.

The power component 606 provides power to the various components of the apparatus 600. The power component 606 may include a power management system, one or more power supplies, and other components associated with generating, managing, and distributing power for the apparatus 600.

The multimedia component 608 includes a screen providing an output interface between the apparatus 600 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia component 608 includes a front-facing camera and/or a rear-facing camera. The front camera and/or rear camera can receive external multimedia data when the apparatus 600 is in an operating mode, such as shooting mode or video mode. Each front camera and rear camera may be a fixed optical lens system or have focal length and optical zoom capability.

The audio component 610 is configured to output and/or input audio signals. For example, the audio component 610 includes a microphone (MIC) configured to receive external audio signals when the apparatus 600 is in an operating mode, such as call mode, recording mode, and voice recognition mode. The received audio signal may be further stored in memory 604 or sent via communication component 616. In some embodiments, the audio component 610 further includes a speaker for outputting audio signals.

The I/O interface 612 provides an interface between the processing component 602 and a peripheral interface module, the peripheral interface module may be a keyboard, click wheel, button, etc. These buttons may include, but are not limited to: a home button, a volume button, a start button, and a lock button.

The sensor component 614 includes one or more sensors for providing status assessment of various aspects of the apparatus 600. For example, the sensor component 614 may detect an open/closed state of the apparatus 600, the relative positioning of components, such as the components being the display and keypad of the apparatus 600, the sensor component 614 may also detect a change in position of the apparatus 600 or a component of the apparatus 600, the presence or absence of user contact with the apparatus 600, the orientation or acceleration/deceleration of the apparatus 600 and temperature changes of the apparatus 600. The sensor component 614 may include a proximity sensor configured to detect the presence of a nearby object in the absence of any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication between the apparatus 600 and other devices by wired or wireless means. The apparatus 600 may access a wireless network based on a communication standard, such as WiFi, 2G, 3G, 4G (LTE), 5G, or a combination thereof. In one embodiment, communication component 616 receives broadcast signals or broadcast-related information from an external broadcast management system via a broadcast channel. In an embodiment, the communication component 616 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In some embodiments, the apparatus 600 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing the method for determining information as described in any one of the above embodiments.

In some embodiments, there is also provided a non-transitory computer readable storage medium including instructions, such as a memory 604 including instructions, the instructions being executable by the processor 620 of the apparatus 600 to implement the method described above. For example, said non-transitory computer readable storage medium may be ROM, random access memory (RAM), CD-ROM, magnetic tape, floppy disk, and optical data storage devices, among others.

Those skilled in the art will easily expect other embodiments of the present disclosure upon consideration of the specification and practice of the disclosure disclosed herein. This disclosure is intended to cover any variations, uses, or adaptations of the present disclosure that follow the general principles of the present disclosure and include commonly known or customary technical means in the art that are not disclosed herein. The specification and embodiments are considered exemplary only, and the true scope and spirit of the present disclosure is indicated by the following claims.

It should be understood that the present disclosure is not limited to the precise structure already described above and illustrated in the accompanying drawings, and that various modifications and changes may be made without departing from its scope. The scope of the present disclosure is limited only by the appended claims.

It is noted that in this document, relationship terms such as “first” and “second” are used only to distinguish one entity or operation from another, and do not necessarily require or imply any such actual relationship or order between these entities or operations. The term “includes,” “comprises,” or any other variation thereof, is intended to cover non-exclusive inclusion so that a process, method, article, or apparatus that includes a set of elements includes not only those elements, but also other elements not explicitly listed, or also includes the process, method, article, or apparatus for which such process, method, article, or apparatus is intended, or further include elements that are inherent to such process, method, article, or apparatus. Without further limitation, the elements defined by the statement “including a/an . . . ” do not preclude the existence of additional identical elements in the process, method, article, or device that includes the elements.

The method and apparatus provided by the embodiments of the present disclosure are described in detail above, and specific examples are used to illustrate the principles and implementation of the present disclosure. The above description of the embodiments is only used to help understand the method of the present disclosure and its core ideas; at the same time, for a person of ordinary skill in the art, there will be changes in the specific implementation and scope of application based on the ideas of the present disclosure, and in summary, the contents of this specification should not be construed as a limitation of the present disclosure.

What is claimed is:

1. A method for indicating information, performed by a base station, comprising:

sending a paging signaling to a terminal configured with a first SIM card and a second SIM card, wherein a PagingRecord unit of the paging signaling carries indication information, and a paging cause of the first SIM card and a paging cause of the second SIM card are comprised in the indication information of the same paging signaling, wherein the paging cause of the first SIM card and the paging cause of the second SIM card are configured for determining an execution order of communication operations corresponding to the first SIM card and the second SIM card; and wherein the base station is a first base station corresponding to the first SIM card, the second SIM card corresponds to a second base station, and the first base station acquires the paging cause of the second SIM card from the second base station.

2. The method according to claim 1, wherein the paging cause is a preset candidate paging cause; and the indication information is one of:

an enumeration value corresponding to the candidate paging cause; a Boolean value corresponding to the candidate paging cause; or an integer value corresponding to the candidate paging cause.

3. The method according to claim 2, wherein in response to the indication information being the integer value, the indication information occupies at least one bit.

4. The method according to claim 1, wherein the paging cause is at least one of a plurality of preset candidate paging causes; and the indication information is one of:

an enumeration value corresponding to at least one of the candidate paging causes; a string corresponding to at least one of the candidate paging causes; or an integer value corresponding to at least one of the candidate paging causes.

5. The method according to claim 4, wherein in response to the indication information being the integer value, the indication information at least occupies $\log_2 N$ bits, wherein N is a number of the candidate paging causes.

6. A method for determining information, performed by a terminal configured with a first SIM card and a second SIM card, the method comprising:

receiving a paging signaling sent by a first base station corresponding to the first SIM card; wherein a PagingRecord unit of the paging signaling carries indication information, and a paging cause of the first SIM card and a paging cause of the second SIM card are comprised in the indication information of the same paging signaling; and determining, based on the indication information, a paging cause of the paging signaling; wherein the paging cause of the first SIM card and the paging cause of the second SIM card are configured for determining an execution order of communication operations corresponding to the first SIM card and the second SIM card; and wherein the second SIM card corresponds to a second base station, and the first base station acquires the paging cause of the second SIM card from the second base station.

7. The method according to claim 6, wherein the paging cause is a preset candidate paging cause; and the determining the paging cause based on the indication information comprises one of:

determining, in response to the indication information being an enumeration value, the candidate paging cause corresponding to the enumeration value;

determining, in response to the indication information being a Boolean value, the candidate paging cause corresponding to the Boolean value; or determining, in response to the indication information being an integer value, the candidate paging cause corresponding to the integer value.

8. The method according to claim 7, wherein in response to the indication information being the integer value, the indication information occupies at least one bit.

9. The method according to claim 6, wherein the paging cause is at least one of a plurality of preset candidate paging causes; and the terminal is preset with a corresponding relationship between the candidate paging cause and the indication information;

the determining the paging cause based on the indication information comprises one of:

determining, in response to the indication information being at least one enumeration value, at least one candidate paging cause corresponding to the at least one enumeration value based on the corresponding relationship;

determining, in response to the indication information being at least one string, at least one candidate paging cause corresponding to the at least one string based on the corresponding relationship; or determining, in response to the indication information being at least one integer value, at least one candidate paging cause corresponding to the at least one integer value based on the corresponding relationship.

10. The method according to claim 9, wherein in response to the indication information being the integer value, the indication information at least occupies $\log_2 N$ bits; wherein N is a number of the candidate paging causes.

11. The method according to claim 6, wherein the determining the paging cause of the paging signaling based on the indication information comprises:

acquiring a parameter unit for carrying the indication information in the PagingRecord unit of the paging signaling; and determining the paging cause based on the indication information.

12. A terminal, comprising:

a processor; and a memory for storing executable instructions of the processor;

wherein the processor is configured to perform the method according to claim 6.

13. A base station, comprising:

a processor; and a memory for storing executable instructions of the processor;

wherein the processor is configured to:

send a paging signaling to a terminal configured with a first SIM card and a second SIM card, wherein a PagingRecord unit of the paging signaling carries indication information, and a paging cause of the first SIM card and a paging cause of the second SIM card are comprised in the indication information of the same paging signaling, wherein the paging cause of the first SIM card and the paging cause of the second SIM card are configured for determining an execution order of communication operations corresponding to the first SIM card and the second SIM card; and wherein the base station is a first base station corresponding to the first SIM card, the second SIM card corresponds to a second base station, and the first base station acquires the paging cause of the second SIM card from the second base station.

14. The base station according to claim 13, wherein the paging cause is a preset candidate paging cause; and the indication information is one of:

an enumeration value corresponding to the candidate paging cause; a Boolean value corresponding to the candidate paging cause; or an integer value corresponding to the candidate paging cause.

15. The base station according to claim 14, wherein in response to the indication information being the integer value, the indication information occupies at least one bit.

* * * * *